Nov. 11, 1930.  J. A. WRIGHT  1,781,206
TRACTOR
Filed Dec. 7, 1927   3 Sheets-Sheet 2

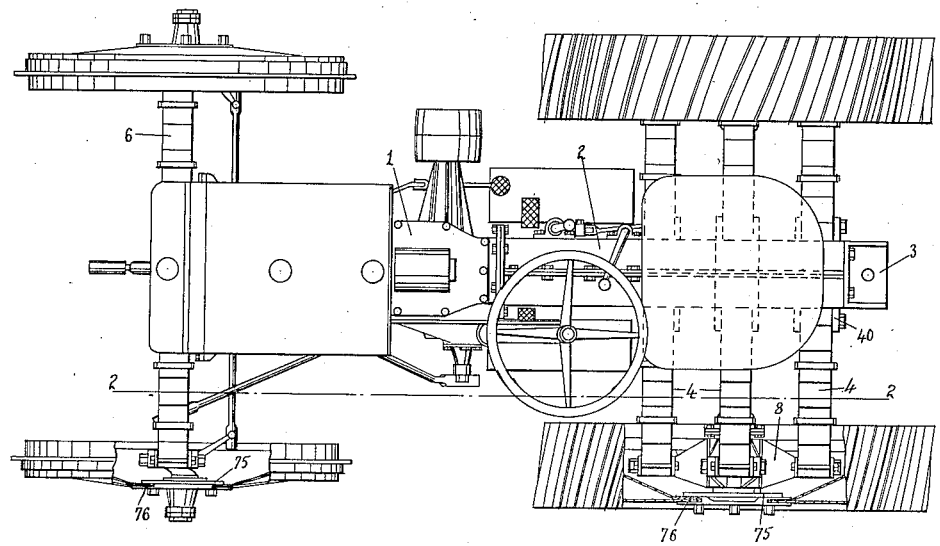
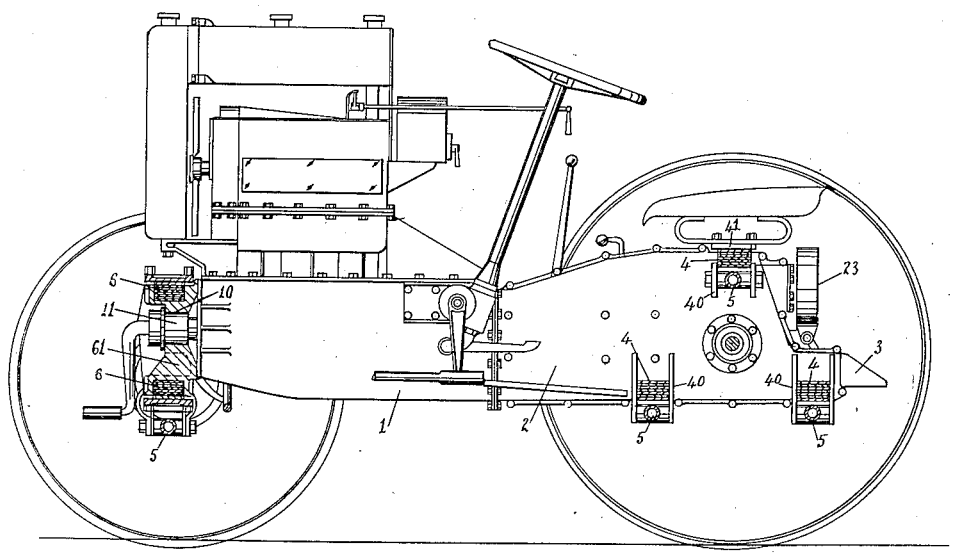

INVENTOR.
JAMES A. WRIGHT.
By
ATTORNEY.

Nov. 11, 1930.        J. A. WRIGHT        1,781,206
TRACTOR
Filed Dec. 7, 1927        3 Sheets-Sheet 3
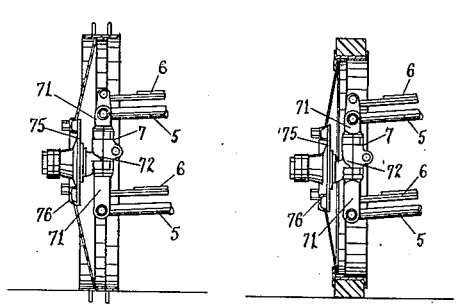
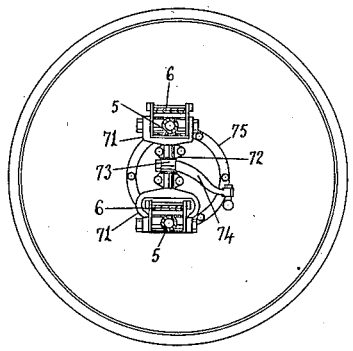
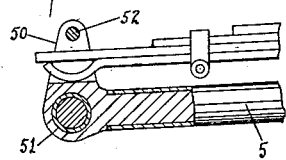
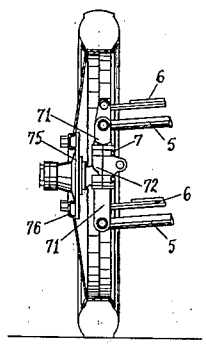
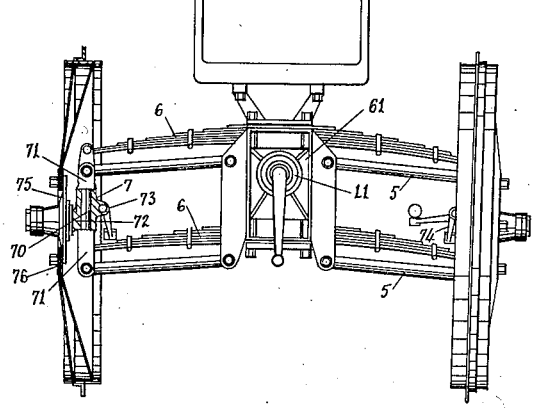
INVENTOR.
JAMES A. WRIGHT.
By
ATTORNEY.

Patented Nov. 11, 1930

1,781,206

UNITED STATES PATENT OFFICE

JAMES A. WRIGHT, OF MONTREAL, QUEBEC, CANADA

TRACTOR

Application filed December 7, 1927. Serial No. 238,398.

This invention relates to motor vehicles and more particularly to those of the tractor type, having four wheels mounted on independent axles, and having transverse spring suspension.

The object of my invention is to provide an improved form of tractor, of a size suitable for a great variety of uses, having a number of features novel in the art.

As the surface on which tractors are used may vary from the roughest ground to good roads, the suspension of the chassis on the wheels should be capable of meeting violent shocks and sudden changes of level with the least disturbance. By means of transverse spring suspension and independent axles on which the wheels are mounted this object is achieved. By means of this form of tractor construction the draw bar pull is even and steady and is not subjected to the direct effect of wheel shocks which are to a large extent absorbed in the transverse springs of the chassis. This not only occurs with regard to vertical displacement but also to side sway.

Whereas the function of the spring suspension of load carrying motor vehicles is to reduce the effect of road shocks on the chassis, the function of spring suspension in tractors is to reduce the effect of shocks from the wheels to the draw bar and to prevent its displacement from the line of drag. On the steadiness and evenness of the draw bar pull, the action of the trailer will depend, and by eliminating disturbances to the trailer, more efficient service will be obtained.

While the standard forms and sizes of tractors are suitable for a work of a limited character, this invention provides a tractor suitable for a great variety of uses by the substitution of sets of wheels, whereby it is readily and rapidly converted from a plowing or field tractor to a road tractor suitable for towing on good roads, a shop or dock tractor suitable for indoor use or street cleaning service, or a lawn tractor suitable for golf courses and the like.

Fig. 1 is a plan view of the tractor.

Fig. 2 is a side elevation on the line 2—2 of Fig. 1.

Fig. 8 is a front end view of the tractor.

Fig. 9 is an inside view of the front wheel carrier.

Figs. 10, 11 and 12 show various types of replacement front wheels.

Fig. 13 shows the radius rod fork ends and spring rest.

Figure 4:
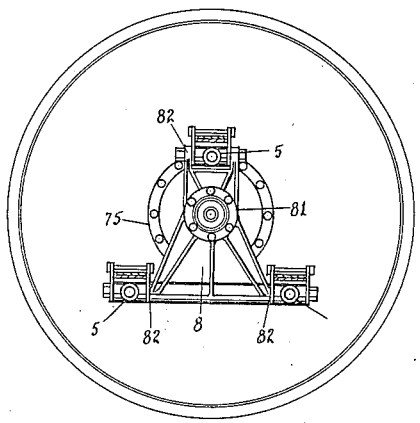
Fig. 4 is an inside view of the rear wheel carrier.
Figure 5:
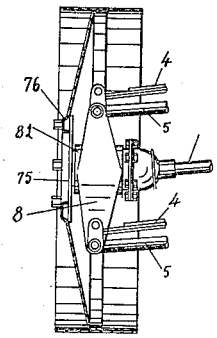
Figs. 5, 6 and 7 show various types of replacement wheels.
Figure 6:
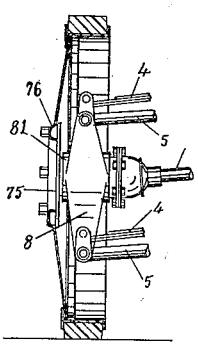
Figure 7:
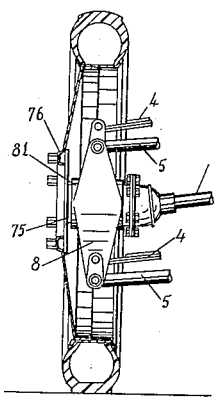
Figure 3:
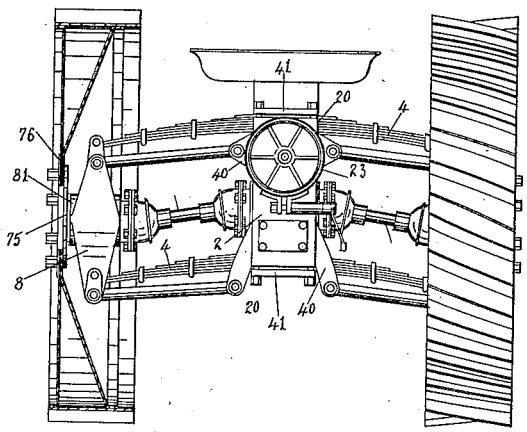
Fig. 3 is a rear end view of the tractor.

The frame comprises a troughed casing 1, providing a casing for the crank shaft and clutch mechanism, and having a trunnion 11, projecting from the forward end. To this casing 1, is secured a centrally split transmission and differential casing 2, having transverse seats 20, above and below for the rear springs 4, which are semi-elliptic, and a draw bar 3, is secured to the lower edge of the rear end.

The sides of this casing 2, are parallel, with brackets 40, projecting outwardly on each side of the spring seats 20, to which radius rods 5, are pivoted.

The front springs 6, are seated above and below a yoke block 61, which has side brackets 62, for the radius rods 5, and a central bearing 10, for the trunnion 11, of the frame 1.

The front wheel carrier 7, consists of a spindle 70, with forks 71, at each end, in which the radius rods 5, are journalled. Mounted on the spindle 70, between the forks 71, of the wheel carrier 7, is a sleeve 72, carrying the stub axle, which is offset to provide castor effect, and also a socket 73, for the steering lever 74.

The sleeve 72, is split vertically and one half carries the stub axle while the steering lever socket 73, is in the other half. Suitable bolts secure the sleeve on the spindle.

The hub of the wheel has a disc 75, which is detachable from the ring plate 76, of the wheel. A set of wheels may comprise a field wheel with projecting flange, a road wheel with pneumatic tire, a shop wheel with solid rubber tire, and a turf wheel provided with projecting pins.

The rear wheel suspension consists of preferably three transverse springs 4, seated in seats 20, in the frame 2, above and below the differential and secured by suitable anchor plates 41, with radius rods 5, pivoted to brackets 40, below each spring 4.

The radius rods 5, and springs 4, are coupled at their outer ends to wheel carriers 8. These wheel carriers 8, comprise a central sleeve 81, in which the wheels are journalled, with horizontal bearings 82, above and below for the ends of the radius rods 5.

The hub of the wheel which is splined to the end of the driving stub shafts 22, in the usual manner is also provided with a disc plate 75, detachable from the ring plate 76, of the wheel in the same manner as the front wheel. A similar set of wheels are provided for replacement. The field wheel carries a series of projecting cleats.

The brake drum 23, is mounted on the end of the worm drive shaft outside the frame 2. This shaft is mounted over the differential gear.

The transmission (not shown) is of the two stage type whereby a wide variety of speeds is obtainable. By this means and the interchange of the wheel sets, the tractor can be run at a low range of speeds for field work and a much higher range of speeds for road work.

Whereas in the common form of mounting of transverse springs in motor vehicles, their ends are secured directly to the wheel carriers or to shackles pivoted thereto, the transverse springs are herein shown with their ends in sliding connection with forks 50, as in Fig. 13, projecting from the pivoted ends 51, of the radius rods 5, and retained therein by bolts 52, across the ends of the forks. Two leaves of the spring extend into the fork 50, and the lower leaf may be cupped to provide a shorter contact. This mounting provides a very efficient spring action and reduces the number of wearing parts in the coupling. Other forms of spring couplings to the wheel carrier may be substituted.

The draw bar 3 is a bracket bolted to the rear end of the frame 2, at a low level. The pull is central to the frame and is on the spring supported portion of the vehicle.

It is well known that vehicles with transverse spring suspension and independent wheel mounting provide the chassis with a freedom from displacement and a maintenance of smooth running during road shocks, unobtainable by those of the solid axle type.

When applied to a tractor, the effect is to provide a steady draw bar pull, not interfered with by the position of the wheels when displaced by ground obstructions.

This result will greatly improve the efficiency of the tractor in plowing uneven ground and will produce more perfect furrows, while the operator, riding on the sprung chassis, will have more efficient control of the tractor. The side sway of trailers is reduced to a minimum.

The tractor is provided with a power shaft and pulley at one side of the clutch mechanism, which is directly driven from the main driving shaft.

What I claim is:—

1. In a tractor having transverse spring suspension, the combination of a central frame comprising a trough casing, adapted to house the crank shaft and clutch mechanism, and to support the engine, radiator and fuel tank having a central trunnion projecting forwardly therefrom, with a front yoke having a trunnion bearing mounted thereon having transverse spring seats, springs in the seats coupled to wheel carriers and wheels journalled on the wheel carriers.

2. In a vehicle having transverse spring suspension, a frame comprising a central longitudinal casting, a trunnion centrally mounted thereon transversely of the spring suspension, and means to pivot the transverse spring suspension on the trunnion.

3. In a vehicle having transverse spring suspension a frame, a trunnion centrally mounted at its front end, a spring bearing yoke block pivotally mounted on the trunnion, having transverse seats above and below, springs seated therein, side lugs to the yoke block adjacent the spring seats, radius rods pivoted thereto, the outer ends of the springs and radius rods being coupled to wheel carriers and wheels journalled on the wheel carriers.

JAMES A. WRIGHT.